US010902250B2

(12) United States Patent
Konin et al.

(10) Patent No.: US 10,902,250 B2
(45) Date of Patent: Jan. 26, 2021

(54) MODE-CHANGEABLE AUGMENTED REALITY INTERFACE

(71) Applicant: Microsoft Technology Licensing, LLC, Redmond, WA (US)

(72) Inventors: Andrey Konin, Redmond, WA (US); Michael Bleyer, Seattle, WA (US); Yuri Pekelny, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/230,581

(22) Filed: Dec. 21, 2018

(65) Prior Publication Data

US 2020/0202121 A1 Jun. 25, 2020

(51) Int. Cl.
*G06K 9/00* (2006.01)
*G06T 19/00* (2011.01)
*G06F 3/01* (2006.01)
*G06F 3/02* (2006.01)

(52) U.S. Cl.
CPC ......... *G06K 9/00375* (2013.01); *G06F 3/017* (2013.01); *G06F 3/0219* (2013.01); *G06T 19/006* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006;

(Continued)

(56) References Cited

U.S. PATENT DOCUMENTS 6,614,422 B1 * 9/2003 Rafii ..................... G06F 1/1626
  345/156
8,228,315 B1 7/2012 Starner et al.
9,448,624 B2 9/2016 Kim
(Continued)

FOREIGN PATENT DOCUMENTS

WO 2017139871 A1 8/2017

OTHER PUBLICATIONS

"International Search Report and Written Opinion Issued in PCT Application No. PCT/US19/066111", dated Mar. 12, 2020, 11 Pages.

(Continued)

*Primary Examiner* — Todd Buttram
(74) *Attorney, Agent, or Firm* — Workman Nydegger (57) ABSTRACT

Facilitating input to the computing system by displaying an input area on the palm of a human hand, and allowing easy input mode changes using gestures of that hand. Computer vision is used to detect the palm of a human hand. Augmented reality is used to display the input area on that palm of the display human hand. Computer vision may then be used to detect when the other human hand of that user interfaces with the input area. The input area has multiple input modes that each define how input from the input human hand is interpreted by the computing system. In response to the computer vision detected an input mode changing gesture of the display human hand, the computing system changes the input mode of the input area so as to change how input provided by the input human hand is interpreted by the computing system.

19 Claims, 9 Drawing Sheets

(58) Field of Classification Search
CPC ............... G06T 2215/16; H04N 5/272; H04N 2201/3245; A63F 13/10
See application file for complete search history.

(56) References Cited

U.S. PATENT DOCUMENTS

| | | | | |
|---|---|---|---|---|
| 2009/0237361 | A1* | 9/2009 | Mosby | G06F 3/04883 345/173 |
| 2011/0225536 | A1 | 9/2011 | Shams et al. | |
| 2012/0113223 | A1 | 5/2012 | Hilliges et al. | |
| 2013/0158946 | A1* | 6/2013 | Scherberger | G06F 3/014 702/151 |
| 2014/0098018 | A1 | 4/2014 | Kim et al. | |
| 2014/0298266 | A1* | 10/2014 | Lapp | G06F 3/04886 715/835 |
| 2015/0002475 | A1 | 1/2015 | Tiao et al. | |
| 2015/0269783 | A1* | 9/2015 | Yun | G06F 1/1626 345/633 |
| 2016/0224123 | A1 | 8/2016 | Antoniac et al. | |
| 2016/0342217 | A1* | 11/2016 | Chen | G06F 1/163 |
| 2017/0357332 | A1 | 12/2017 | Balan et al. | |
| 2017/0371405 | A1 | 12/2017 | Kwon et al. | |
| 2018/0350150 | A1* | 12/2018 | Powderly | G06F 3/0213 |

OTHER PUBLICATIONS

Hayden, Scott, "VRgineers to Integrate Leap Motion Hand-tracking Into Its Wide FOV VRHero", Retrieved from: https://www.roadtovr.com/vrgineers-integrate-leap-motion-hand-tracking-wide-fov-vrhero-headset/, Mar. 13, 2018, 6 Pages.

Liang, et al., "3D Fingertip and Palm Tracking in Depth Image Sequences", In Proceedings of the 20th ACM international conference on Multimedia, Oct. 29, 2012, pp. 785-788.

Park, et al., "Hand Tracking with a Near-Range Depth Camera for Virtual Object Manipulation in an Wearable Augmented Reality", In Proceedings of International Conference on Virtual, Augmented and Mixed Reality, Jun. 22, 2014, pp. 396-405.

Taylor, et al., "Efficient and Precise Interactive Hand Tracking through Joint, Continuous Optimization of Pose and Correspondences", In Journal of ACM Transactions on Graphics, vol. 35, Issue 4, Jul. 24, 2016, 12 Pages.

Walles, Hayden, "A keyboard in the palm of your hand", Retrieved from: https://www.smh.com.au/technology/a-keyboard-in-the-palm-of-your-hand-20111129-1o4ut.html, Retrieved Date: Mar. 22, 2018, 3 Pages.

* cited by examiner

MODE-CHANGEABLE AUGMENTED REALITY INTERFACE

BACKGROUND

Computing systems often interface with human beings. To do so, computing systems provide information to a user by rendering information on an appropriate output device(s), such as a display or speakers. Users may use input devices (such as a keyboard, mouse, microphone, or the like) to provide information to the computing system.

Augmented reality allows computerized output to be rendered so as to appear superimposed on and/or associated actual surroundings. Augmented reality may also allow a user to interface with controls or other computerized renderings that are visualized so as to seem to appear superimposed on and/or associated with the user's surroundings.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to facilitating input to the computing system by displaying an input area on the palm of a human hand, and allowing easy input mode changes using gestures of that hand. Computer vision is used to detect the palm of a human hand (which will be called herein a "display" human hand). Augmented reality is used to display the input area on that palm of the display human hand. Computer vision may then be used to detect when the other human hand of that user (i.e., an "input" human hand) interfaces with the input area. The input area has multiple input modes that each define how input from the input human hand is interpreted by the computing system. In response to the computer vision detecting an input mode changing gesture of the display human hand, the computing system changes the input mode of the input area so as to change how input provided by the input human hand is interpreted by the computing system.

This form of input allows for convenient and efficient input of information to a computing system using augmented reality by using one hand to interface with the palm of the other hand. Input mode changes (e.g., drawings versus keyboarding, changing from one language to another) may be quickly performed through easy manipulation of the display human hand. Thus, the user is provided with an intuitive and flexible mechanism to input data into a computing system using familiar and convenient manipulations of their own two hands. Thus, the art of augmented reality user interfaces is advanced.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to facilitating input to the computing system by displaying an input area on the palm of a human hand, and allowing easy input mode changes using gestures of that hand. Computer vision is used to detect the palm of a human hand (which will be called herein a "display" human hand). Augmented reality is used to display the input area on that palm of the display human hand. Computer vision may then be used to detect when the other human hand of that user (i.e., an "input" human hand) interfaces with the input area. The input area has multiple input modes that each define how input from the input human hand is interpreted by the computing system. In response to the computer vision detecting an input mode changing gesture of the display human hand, the computing system changes the input mode of the input area so as to change how input provided by the input human hand is interpreted by the computing system.

This form of input allows for convenient and efficient input of information to a computing system using augmented reality by using one hand to interface with the palm of the other hand. Input mode changes (e.g., drawings versus keyboarding, changing from one language to another) may be quickly performed through easy manipulation of the display human hand. Thus, the user is provided with an intuitive and flexible mechanism to input data into a computing system using familiar and convenient manipulations of their own two hands. Thus, the art of augmented reality user interfaces is advanced.

FIGS. 1A through 1F illustrates the various states of two hands of a user, and are used as a walk-through to demonstrate an example user experiences in interfacing with those hands using augmented reality. The user experience begins with FIG. 1A, which illustrates a hand environment 100 that includes two human hands 101 and 102 that are in a particular state 100A. The human hands 101 and 102 may belong to a single human being (hereinafter also referred to as a "user"). Thus, the human hands 101 and 102 are illustrated as they might appear to that user. In this particular state 100A, the palms of the hands 101 and 102 are not exposed to the user, and in particular, are facing away from the user.

Figure 2:
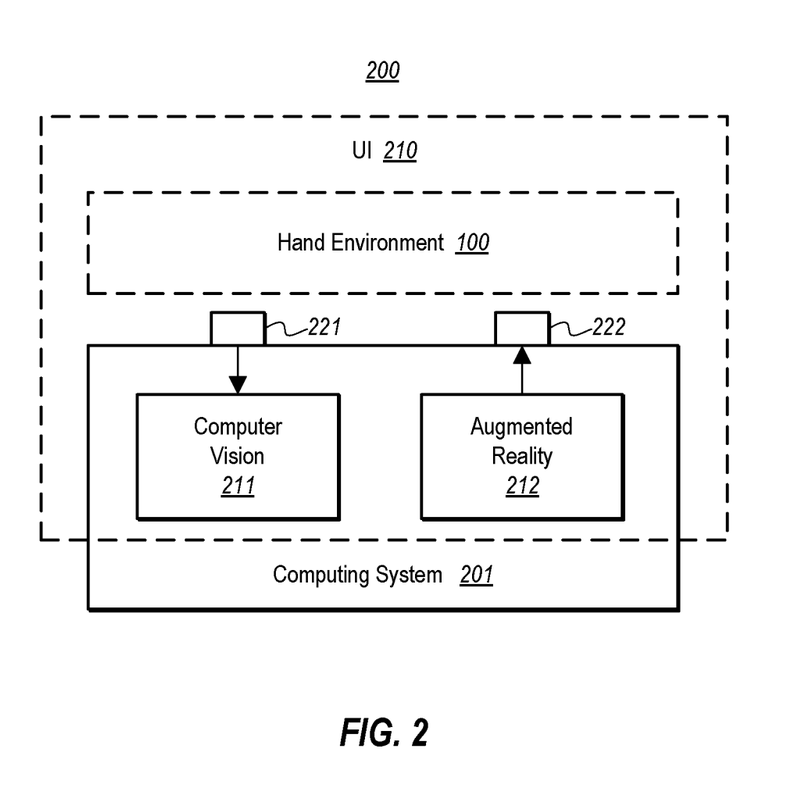
FIG. 2 illustrates a computing environment that includes a computing system that uses the two hands of a user as part of an augmented reality user interface.

FIG. 2 illustrates a computing environment 200 that includes a computing system 201. As a user interface 210, the computing system 201 uses the hand environment 100 in conjunction with a computer vision component 211 an augmented reality component 212. The user interface 210 may also be referred to herein as an "augmented reality" user interface. The user's two hands 101 and 102 play an important role in allowing the user to interface with a computing system using augmented reality. In particular, one of the hands will be used to display an input area and may be referred to herein as a "display hand" or "display human hand". The other of the hands will be used to input into that input area and will be referred to herein as an "input hand" or an "input human hand".

The computer vision component 211 receives input from a camera 221, which is faced towards the hand environment. The camera 221 may capture an image (e.g., color information) of the hand environment 100 including an image of the two hands of the user. Alternatively, the camera 221 may be a depth camera that captures an array of depth information. This might allow the computer vision component 211 to model a three-dimensional representation of the hand environment 100.

The augmented reality component 212 outputs display information to the projector 222. The projector causes patterned light to be provided (either directly or indirectly) into the left and right eyes of the user so as to give the illusion to the user that there is something in the user's surroundings in conjunction with the actual surroundings of the user. As an example, the projector 222 might be a pair of glasses that the user wears. In that case, the camera 221 might be connected to the projector 222 so that the camera 221 points in the general direction of where the user is looking. Eye tracking may also be used to determine where the user is looking.

In the example of FIGS. 1A through 1F, the left hand 101 will be the display human hand, and the right hand 102 will be the input human hand. This might be more convenient for most right-handed users. However, the principles described herein might also be used with the right hand 102 being the display hand, the left hand 101 being the input hand. The identity of the display and input hands may be configurable according to user preferences. Alternatively, or in addition, the identity of the display hand may be dynamically determined based on which hand has its palm exposed. Alternatively, or in addition, the identity of the display hand may be determined based on historic behavior of that user.

In this state, the pixels corresponding to the background can be distinguished from the pixels corresponding to the hands themselves. Then, in one embodiment, the hands may be fit into a parameterized specific hand model using a parameterizable general model of the human hand. For instance, that hand model might include objects corresponding to each bone and joint in the hand. In addition, there might be constraints associated with these objects. For instance, for bones, there might be a constraint that once structural parameters of the bone are set (e.g., length of the bone), those lengths are static over time. For joints, there might be constraints regarding which bones those joints are connected to, and what types of movement are permitted.

Figure 1A:
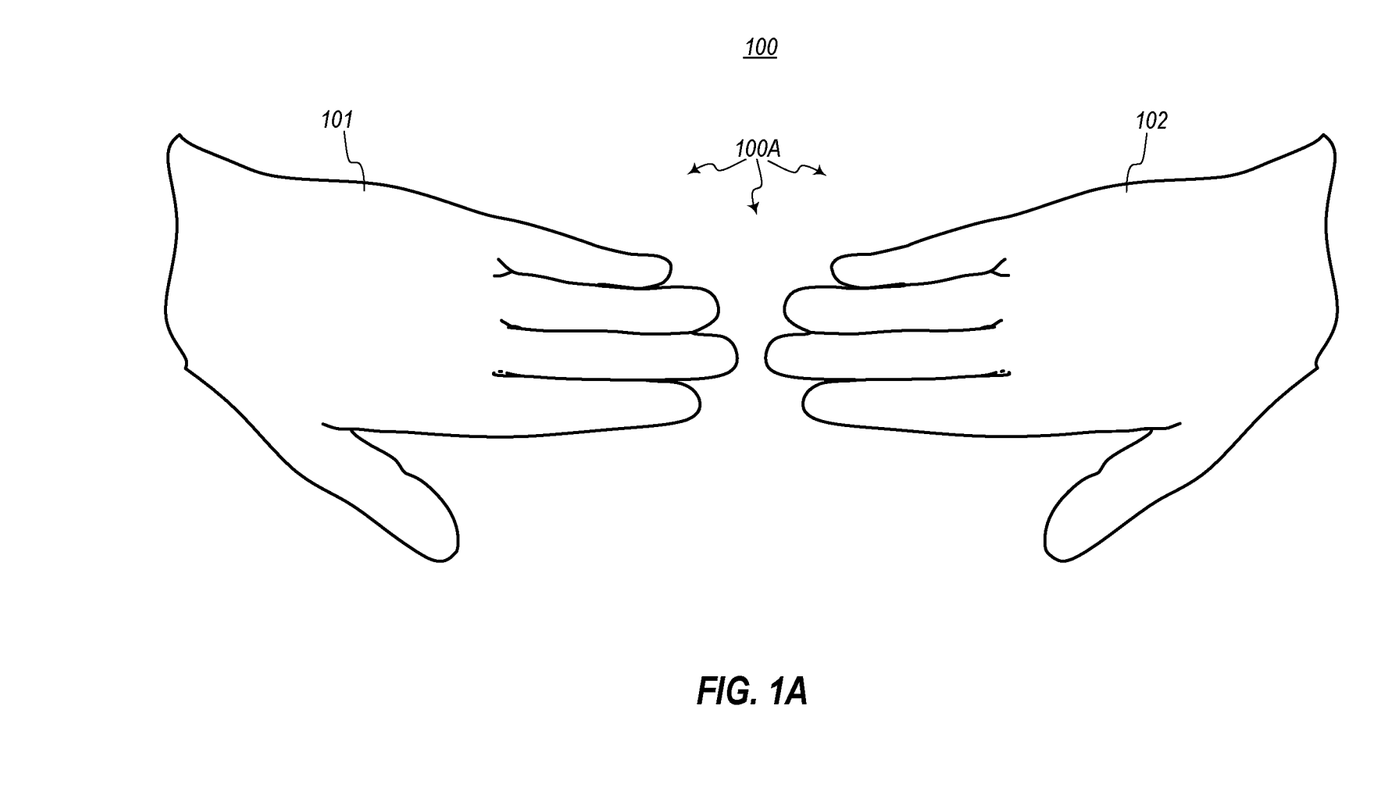
FIG. 1A illustrates a hand environment that includes two hands of a user, a display hand upon which an input area is to be displayed on the palm, and an input hand that is to be used to interface with that input area.

The general hand model might be used for any user, but a particular user-specific set of parameters (e.g., lengths of bones, thickness of fresh around the bone, and so forth) may be used to populate that general hand model to obtain an accurate model of the hand of a given user. Thus, the particular state 100A may be used to identify who the user is. Other forms of authentication may also be used such as retinal identification. Once the user is known, the appropriate specific hand model for that individual may be obtained, and used to recognize hands, hand parts, and hand surfaces.

The principles described herein are not limited to the use of a hand model. However, the use of a hand model allows for calculations to be simplified and more precise when determining the position of the user's hands. It is far faster to perform calculations on a set of labelled points (which is what the hand model permits) as opposed to doing calculations on an entire set of pixel values. This is helpful to ensure faster calculation (and lower latency) when positioning the input area on the palm on the display hand, and when occluding the input hand when it is in front of the input area from the vantagepoint of the user. This lower latency improves tracking of moving hands, and thereby improving the illusion that the input area is on the palm of the display hand.

Figure 1B:
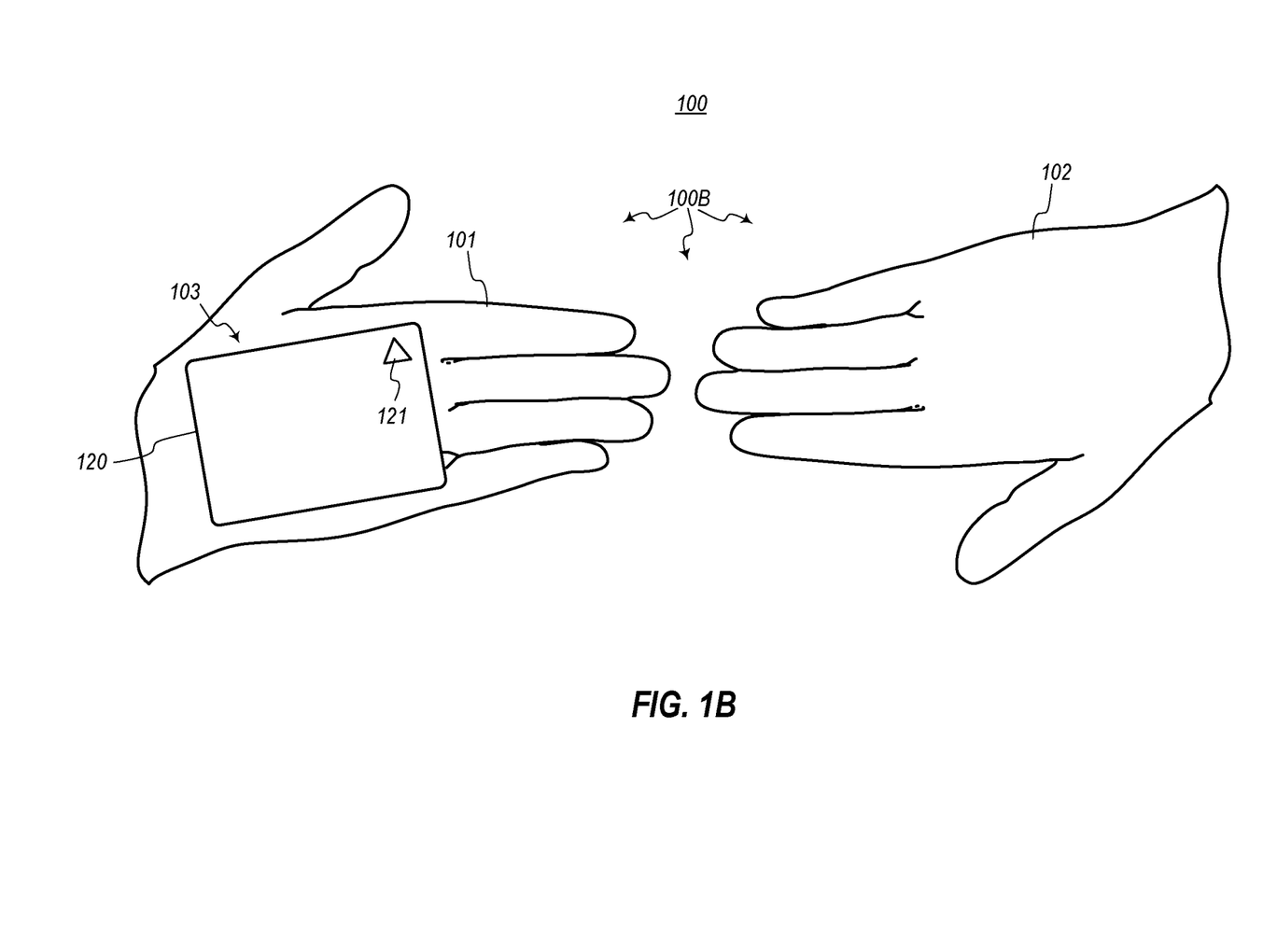
FIG. 1B illustrates the hand environment in which the palm of the display hand is exposed, causing an augmented reality component to cause an input area to appear as though on the palm of the display hand.
Figure 3:
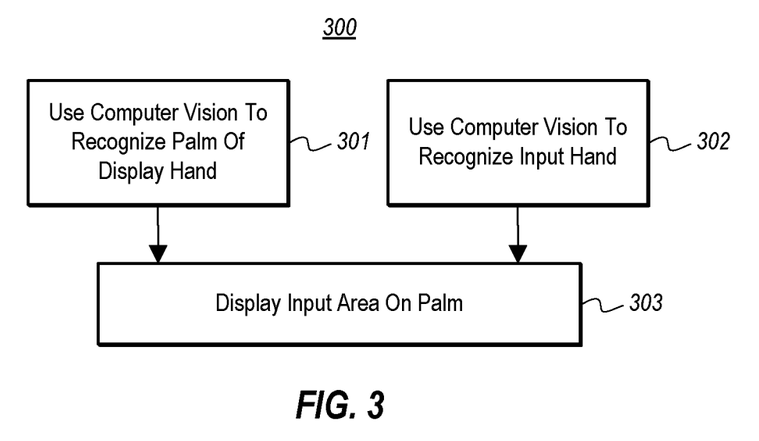
FIG. 3 illustrates a flowchart of a method of facilitating input to the computing system using the two hands of a user in accordance with the principles described herein.

FIG. 1B illustrates the hand environment 100 in a subsequent state 100B in which the left hand 101 is now turned towards the user thereby exposing the palm 103. This triggers the initiation of the method 300 of FIG. 3. FIG. 3 illustrates a flowchart of a method 300 for displaying an input area of a computing system. As the method 300 may be performed by the computing environment 200 of FIG. 2, the method 300 will now be described with frequent reference to the computing environment 200 of FIG. 2, as well as with reference to the sequence of hand environment states of FIGS. 1B through 1F. The method 300 is initiated upon detecting a palm of a display human hand using computer vision (act 301). For instance, the computer vision component 211 of FIG. 2 may be used to allow the computing system 201 to determine that the left hand 101 now has the palm 103 exposed to the user's view. In addition, with the left hand 101 being assigned as the display hand, the computer vision component recognizes the other human hand 102 (act 302).

Referring to FIGS. 1B and 2, upon the computer vision component 211 (see FIG. 2) detecting the palm (e.g., of the left hand 101 in the example hand environment of FIG. 1B), the augmented reality component 212 is caused to display an input area 120 on the palm (act 303). For instance, referring to FIGS. 1B and 2, upon the computer vision component 211 of FIG. 2 detecting the palm 103 of the left hand 101 in the example hand environment of FIG. 1B, the augmented reality component 212 is caused to display an input area 120 on the palm.

As an example only, the user might be wearing glasses that have a camera thereon that is used to feed image and perhaps depth information to the computer vision component 211. The augmented reality component 212 may illuminate particular portions of the glasses so that, to the user, the input area 120 seems to appear on the palm 103 (or at least a reconstructed smoother surface that is at about the font of the palm). However, other forms of augmented user interface devices maybe used consistent with the principles described herein.

Figure 4:
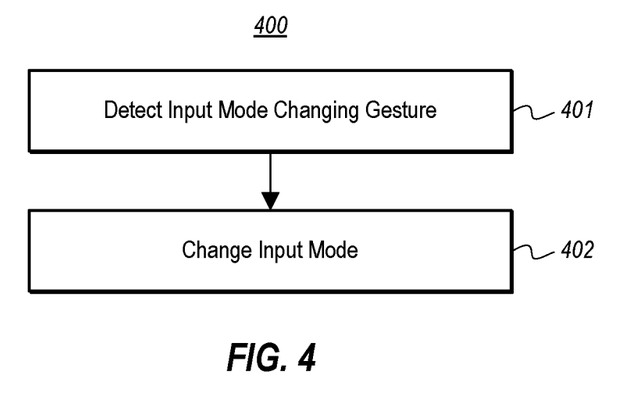
FIG. 4 illustrates a flowchart of a method for changing an input mode of the input area in accordance with the principles described herein.

Referring to FIG. 1B, a triangle 121 is illustrated in the upper right corner of the input area 120 to symbolically represent that the input area 120 is in a first input mode. As an example, the first input mode might be a keyboard. The input area 120 is configured so as to have multiple input modes that each define how input from the input human hand is interpreted by the computing system. FIG. 4 illustrates a flowchart of a method 400 for changing an input mode of the input area. Specifically, computer vision is used to detect an input mode changing gesture of the display human hand (act 401). In response to this gesture, the computing system changes the input mode of the input area so as to change how input provided by the input human hand is interpreted by the computing system (act 402). As an example, the new input mode might be a drawing canvas.

Figure 1C:
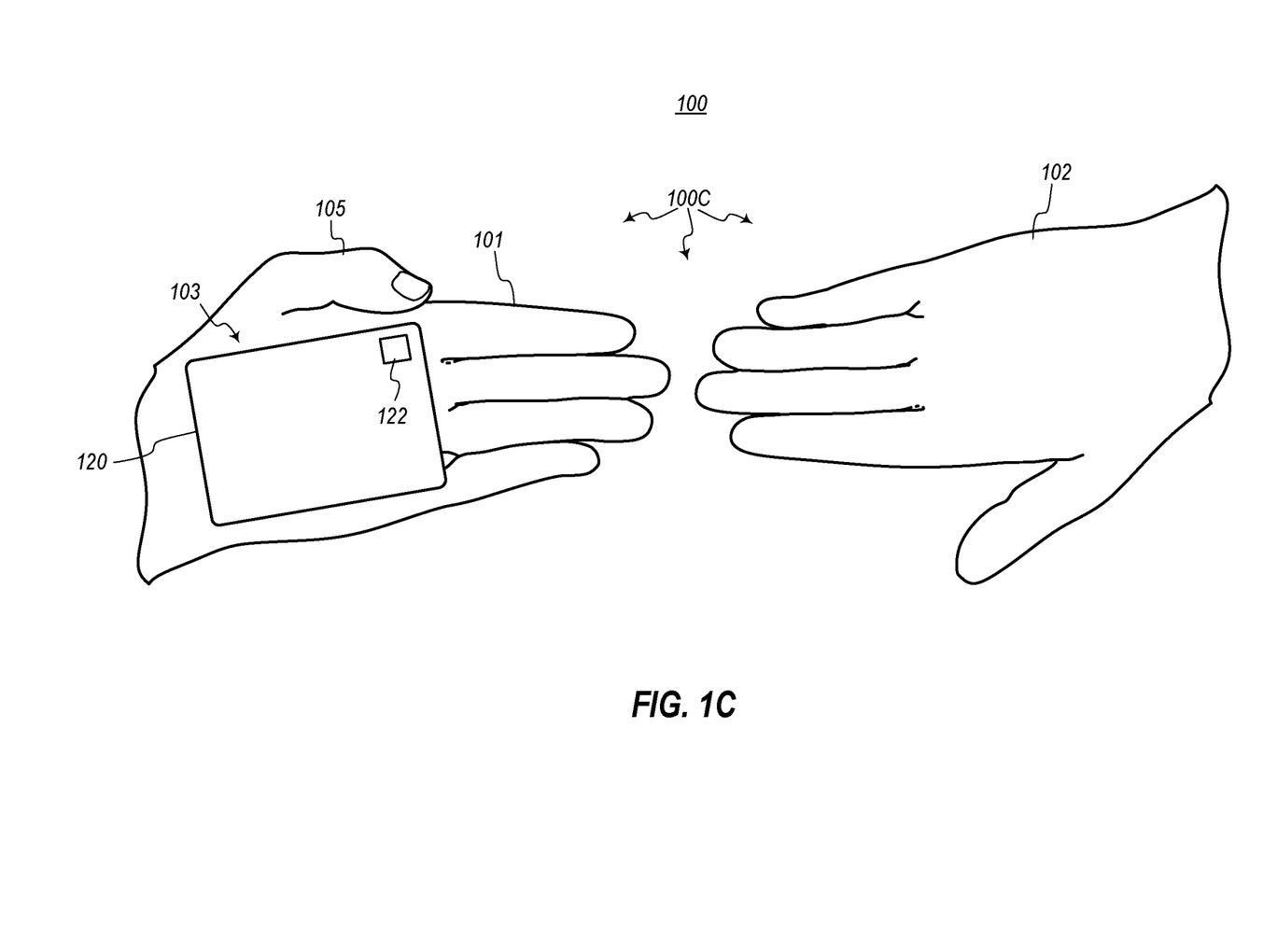
FIG. 1C illustrates the hand environment in which a gesture is used to change an input mode of the input area displayed on the palm of the display hand.

As an example, FIG. 1C illustrates the hand environment 100 in a subsequent state 100C in which the user has lowered the thumb 105 of the display hand 100. As a result, the input area 120 changes input modes are represented by a square now appearing in the upper right corner of the input area 120. Any gesture will suffice. For instance, the user might wave the entirety of the display hand, move a digit of the display hand (e.g., extend the thumb), spread the fingers, tilt the display up or down or away or towards the camera, or any other of an infinite variety of gestures. Alternatively, the gesture may be performed by the input hand. Such input mode changing gestures may be configurable according to the preferences of the user.

As examples of input modes, there might be different types of keyboard modes that are switched between. For instance, there might be a keyboard input mode for use with one language (e.g., English) and a second input keyboard input mode that might be used for another language (e.g., Japanese). There might be a first keyboard input mode that is for caps on, and another for caps off. There might be a first keyboard input mode that is for numerals or characters, and another for letters. The principles described herein may also be used to change between more than two input modes, and there may be more than one input mode change gesture employed. For instance, thumb movement might be used to change between keyboard and drawing input modes, whereas spreading fingers might be used to change keyboard input modes (e.g., between languages). The number and variety of input modes and input mode changing gestures may be configurable to match the user's preferences and intuition.

Figure 1D:
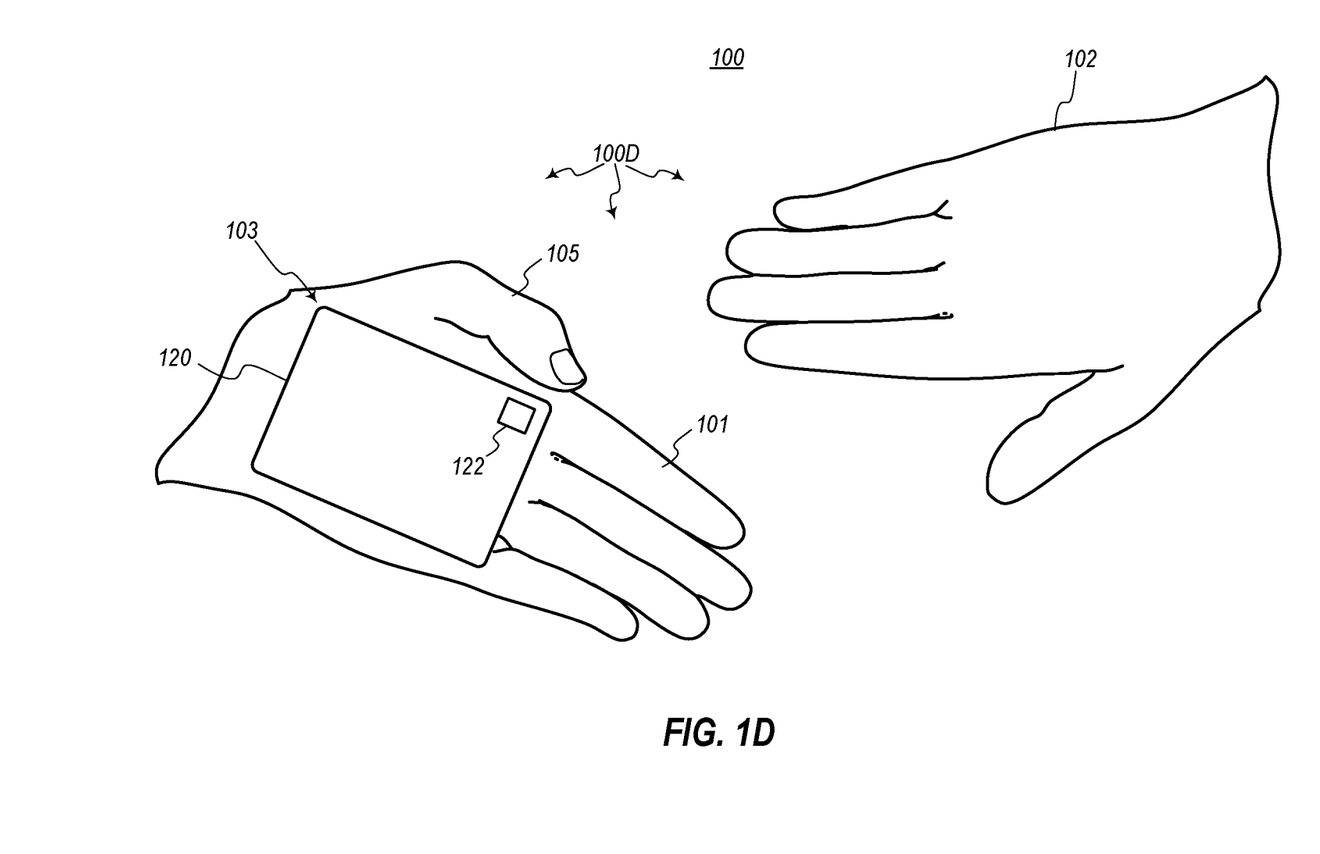
FIG. 1D illustrates the hand environment in which the input area is shown as tracking the position and orientation of the display hand.

The method 300 may be repeatedly performed so as to allow the position of the palm to be tracked. As an example, the repeated performance may be at a frequency (e.g., 60 Hertz) that appears as continuous motion to a user. This gives the user the sensation that the input area continuously follows movement of the display hand, thereby giving the convincing illusion that the input area is truly on the palm of the display hand. For instance, FIG. 1D illustrates the hand environment 100 in a subsequent state 100D in which the display hand has now moved, and in which the input area 120 has tracked the movement.

Figure 1E:
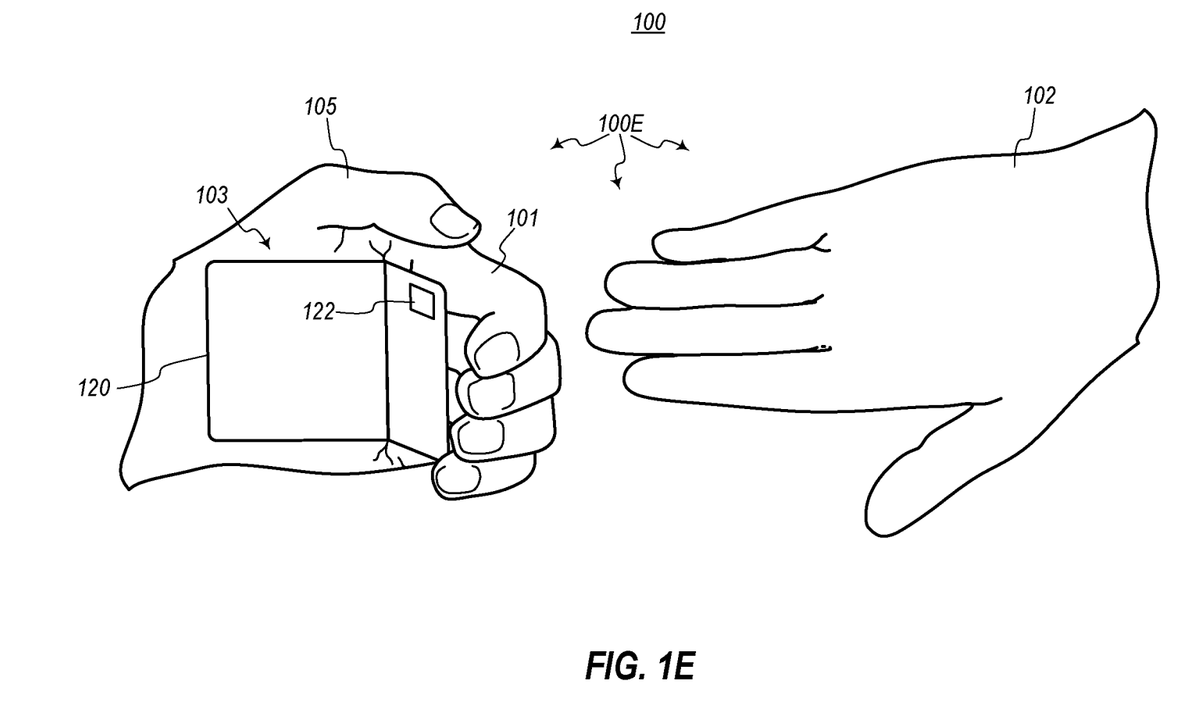
FIG. 1E illustrates the hand environment in which the input area is shown as bending along with the palm of the display hand.
Figure 1F:
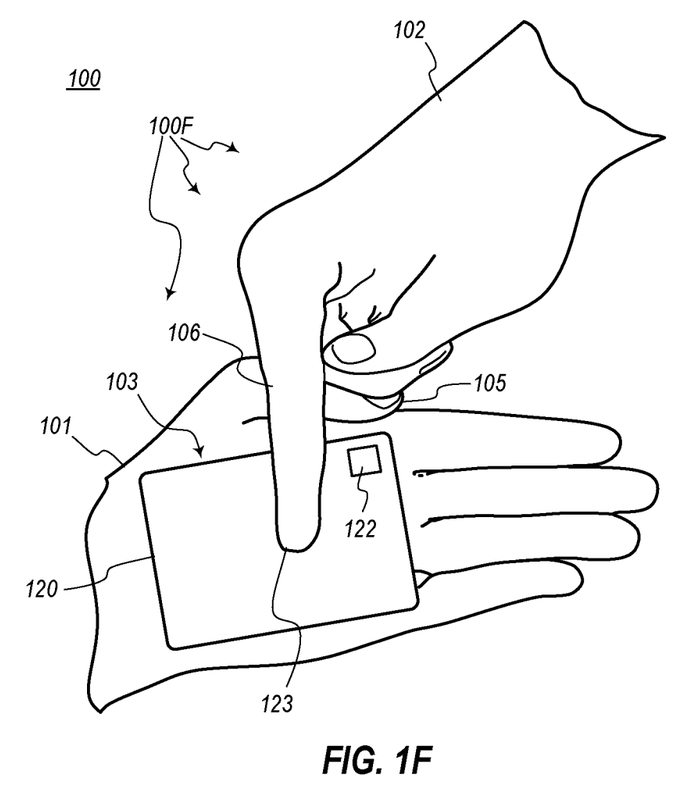
FIG. 1F illustrates the input hand interacting with the input area displayed on the palm of the display hand.

The computer vision may also estimate the position and orientation of multiple joints in the display hand. This allows the augmented reality component to cause the input area that is formed on the palm of the display hand to account for the estimation position and orientation of at least one of the multiple joints in the display hand. In this case, repeatedly performing the method 300 causes the input area to bend with the display hand. Again, this gives the user a convincing illusion that the palm is actually displaying the input area, whereas in reality, the augmented reality projector is merely given the illusion to the user that the input area is on the palm. For instance, FIG. 1E illustrates the hand environment 100 in a subsequent state 100E in which the palm 103 of the display hand 101 has now bent somewhat, causing the input area 120 to also bend.

Figure 5:
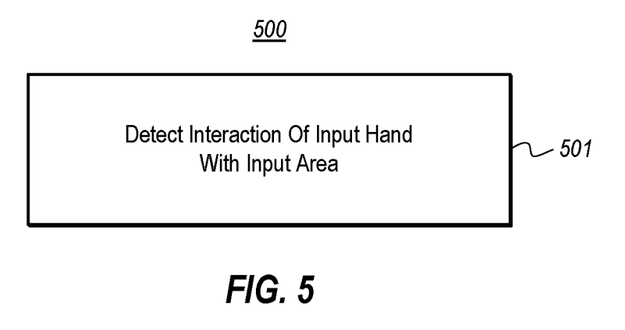
FIG. 5 illustrates a flowchart of a method for detecting user input in accordance with the principles described herein.

FIG. 5 illustrates a flowchart of a method 500 for detecting user input in accordance with the principles described herein. As an example, the method 500 may be performed by the computing system 201 of FIG. 2, in the hand environment 100 having the particular state 100F illustrated in FIG. 1F. Specifically, computer vision is used to detect that the input hand has interacted with the input area (act 501). With respect to FIG. 1F, the pointer finger 106 of the input hand 102 is interacting at point 123 of the input area 120 displayed on the display hand 101. Again, how the computing system 201 interprets that input at the point 123 will depend on the input mode of the input area 120.

In one embodiment, computer vision may gain high confidence that the input hand truly has contacted the display hand based on movement of the display hand. For instance, when a finger of the input hand contacts the palm of the display hand, the display hand will move somewhat, and in a way that is different that transient movement of the human hand that might be expected when just holding the display hand without contact. This improves the detection of interaction between the input human hand and the display human hand.

In addition, to give the user a sense that a contact has been registered by the computing system, the computing system may provide audible feedback in response to detecting that the input human hand has interacted with the input area. For instance, when the user contacts a control within the input area, a click or popping sound may be made. Visual feedback may also be provided such as visually emphasizing any contract that the computing system registers as having been contacted. This type of audible and visible feedback may be especially important for augmented reality user interfaces since the user is not getting the usual haptic feedback that is often present when interfacing with physical devices, such as a keyboard button, or mouse click.

Finally, in order to give the illusion that an input area is actually on the surface of the palm of the display hand, the augmented reality component may perform occlusion of the input human hand in the user's vantage area in front of the input area. Specifically, from augmented reality component refrains from displaying the input area for those portions of the palm that the user cannot see due to the input human hand (or whatever else there might be) that is blocking the user's view of the palm. Thus, as objects (e.g., the input hand) passes in front of the palm, that objects appear to the user to be blocking the input area. For instance, in FIG. 1F, the input area 120 is not shown on the pointer finger 106 of the input hand 102, so as to give the impression that the input area 120 is being blocked by the input hand 102. This further reinforces the illusion that the palm itself is actually displaying the input area. In order to provide accurate occlusion, differences in the vantagepoint of the camera and the eyes may be taken into consideration.

This form of input allows for convenient and efficient input of information to a computing system using augmented reality by using one hand to interface with the palm of the other hand. Input mode changes (e.g., drawings versus keyboarding, changing from one language to another) may be quickly performed through easy manipulation of the display human hand. Thus, the user is provided with an intuitive and flexible mechanism to input data into a computing system using familiar and convenient manipulations of their own two hands. Thus, the art of augmented reality user interfaces is advanced.

Because the principles described herein operate in the context of a computing system, a computing system will be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
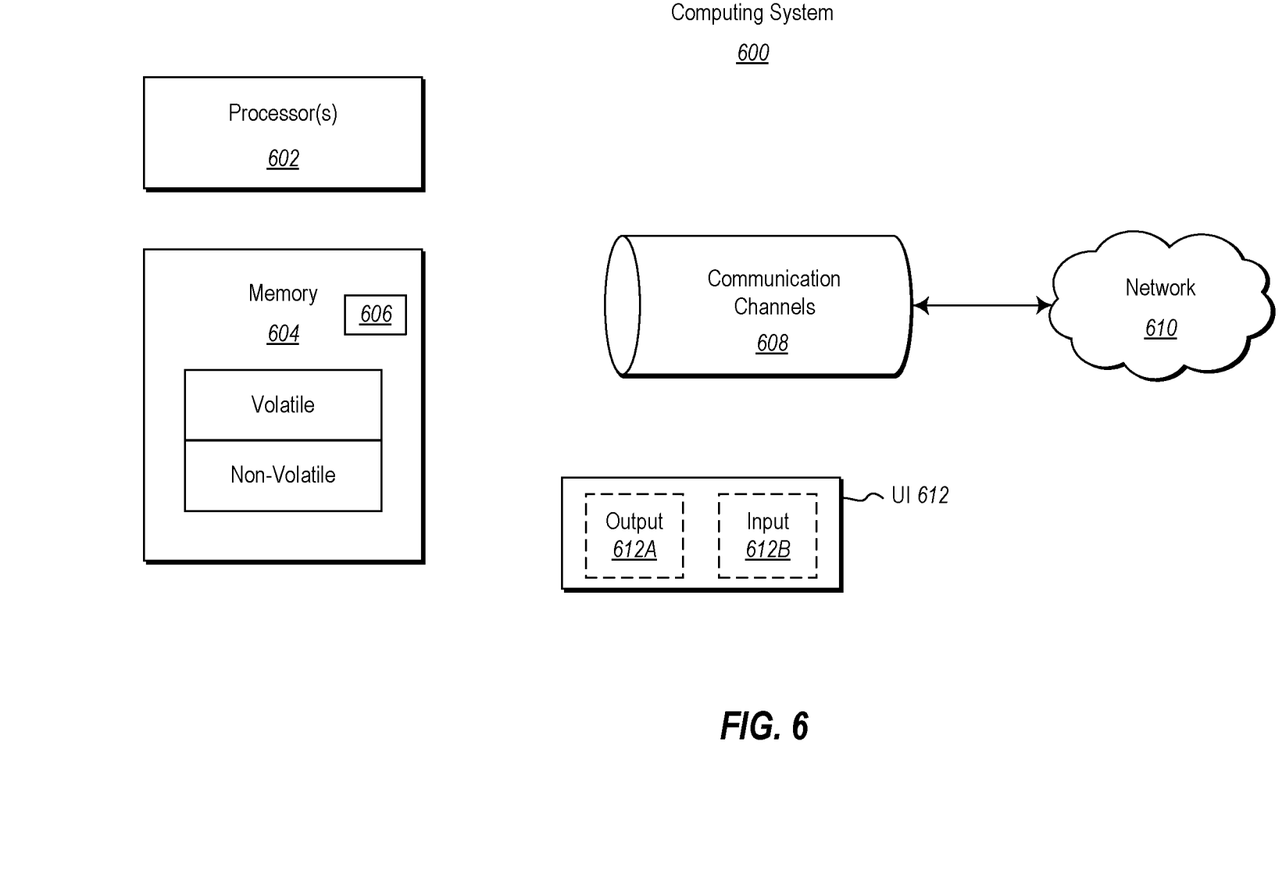
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing. As an example, the computer vision component 211 and the augmented reality component 212 may be structured as described for the executable component 606 of FIG. 6.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having thereon computer-executable instructions that are executable by the one or more processors to configure the computing system to perform at least the following:
   detect a palm of a display human hand using computer vision and by estimating the position and orientation of multiple joints in the display human hand, the display human hand being one human hand of a user;
   display, based at least in part on the estimated position and orientation of at least one of the multiple joints in the display human hand, an input area on the palm of the display human hand using augmented reality, the input area being configured such that computer vision uses at least one finger of an input human hand to detect input into the input area, the input human hand being the other human hand of the user, the input area having multiple input modes that each define how input from the input human hand is interpreted by the computing system;
   use computer vision to detect an input mode changing gesture of the display human hand; and
   in response to detecting the input mode changing gesture of the display human hand, change the input mode of the input area so as to change how input provided by the input human hand is interpreted by the computing system.

2. The computing system in accordance with claim 1, the input mode changing gesture being a movement of a digit of the display human hand.

3. The computing system in accordance with claim 1, the input mode changing gesture being a movement of a thumb of the display human hand.

4. The computing system in accordance with claim 1, the input mode changing gesture being configurable.

5. The computing system in accordance with claim 1, wherein which human hand is the display human hand is configurable.

6. The computing system in accordance with claim 1, the multiple input modes including a keyboard input mode.

7. The computing system in accordance with claim 6, the multiple input modes also including a drawing input mode.

8. The computing system in accordance with claim 1, the multiple input modes including a first keyboard input mode and a second keyboard input mode.

9. The computing system in accordance with claim 1, the multiple input modes including at least three input modes.

10. The computing system in accordance with claim 1, the multiple input modes including a first language input mode for entering input in a first language, and a second language input mode for entering input in a second language.

11. The computing system in accordance with claim 1, the multiple input modes being configurable.

12. The computing system in accordance with claim 1, the computer-executable instructions being further executable to configure the computing system to:
detect that the input human hand has interacted with the input area.

13. The computing system in accordance with claim 12, the computer-executable instructions being further executable to configure the computing system to:
provide audible feedback in response to detecting that the input human hand has interacted with the input area.

14. The computing system in accordance with claim 12, the detection that the input human hand has interacted with the input area comprising:
detecting that the input human hand has contacted the display human hand based on movement of the display human hand.

15. The computing system in accordance with claim 1, the computer-executable instructions being further executable to configure the computing system to repeatedly perform the acts of detecting and displaying so that the input area tracks movement of the display human hand.

16. The computing system in accordance with claim 1, the computer-executable instructions being further executable to configure the computing system to repeatedly perform the acts of detecting and displaying so that the input area bends with the display human hand.

17. The computing system in accordance with claim 1, the displaying further comprising occluding the input human hand in a vantage area in front of the input area.

18. A method of facilitating input to the computing system, the method comprising:
detecting a palm of a display human hand using computer vision, the display human hand being one human hand of a user;
displaying an input area on the palm of the display human hand using augmented reality, the input area being configured such that computer vision uses at least one finger of an input human hand to detect input into the input area, the input human hand being the other human hand of the user, the input area having multiple input modes that each define how input from the input human hand is interpreted by the computing system; and
detecting that the input human hand has interacted with the input area by detecting that the input human hand has contacted the display human hand based on movement of the display human hand.

19. A computing system comprising:
one or more processors; and
one or more computer-readable storage media having thereon computer-executable instructions that are executable by the one or more processors to configure the computing system to perform at least the following:
detect a display portion of a display human body part using computer vision;
display an input area on the display portion of the display human body part using augmented reality, the input area being configured such that computer vision uses at least one finger of an input human hand to detect input into the input area, the input area having multiple input modes that each define how input from the input human hand is interpreted by the computing system; and
detect that the input human hand has interacted with the input area by detecting that the input human hand has contacted the display human body part based on movement of the display human body part.

* * * * *